US012650783B2

(12) United States Patent
Athreya et al.

(10) Patent No.: US 12,650,783 B2
(45) Date of Patent: *Jun. 9, 2026

(54) CONTROLLING MEMORY OVERHEAD FOR STORING INTEGRITY DATA IN SOLID STATE DRIVES

(71) Applicant: SK Hynix NAND Product Solutions Corp., Rancho Cordova, CA (US)

(72) Inventors: Arun Athreya, Rancho Cordova, CA (US); Yihua Zhang, Rancho Cordova, CA (US); Shankar Natarajan, Rancho Cordova, CA (US); Sriram Natarajan, Rancho Cordova, CA (US)

(73) Assignee: SK Hynix Nand Product Solutions Corp, Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/902,619

(22) Filed: Sep. 30, 2024

(65) Prior Publication Data

US 2025/0021255 A1      Jan. 16, 2025

Related U.S. Application Data

(63) Continuation of application No. 18/113,495, filed on Feb. 23, 2023, now Pat. No. 12,118,222.

(51) Int. Cl.
*G06F 3/06* (2006.01)

(52) U.S. Cl.
CPC ............ *G06F 3/064* (2013.01); *G06F 3/0619* (2013.01); *G06F 3/0683* (2013.01)

(58) Field of Classification Search
CPC ...... G06F 3/064; G06F 3/0619; G06F 3/0683; G06F 3/0679
See application file for complete search history.

(56) References Cited

U.S. PATENT DOCUMENTS

| | | | |
|---|---|---|---|
| 12,118,222 B2 | 10/2024 | Athreya et al. | |
| 2011/0161779 A1 | 6/2011 | Otsuka et al. | |

(Continued)

FOREIGN PATENT DOCUMENTS

| | | | |
|---|---|---|---|
| KR | 20210077791 A | 6/2021 | |

OTHER PUBLICATIONS

SK Hynix NAND Product Solutions Corp. (dba Solidigm), PCT/US2024/016954, International Search Report and Written Opinion, Jun. 13, 2024, 7 pgs.

(Continued)

*Primary Examiner* — Francisco A Grullon
(74) *Attorney, Agent, or Firm* — Morgan, Lewis & Bockius LLP

(57) ABSTRACT

This application is directed to data protection in a memory system of an electronic device. The memory system has a first memory block and a second memory block, and each memory block includes one or more respective memory dies. Each memory die of the second memory block is distinct from the one or more respective memory dies of the first memory block. The electronic device stores user data including a plurality of user data items in the first memory block and integrity data including a plurality of integrity data items in the second memory block. Each of the plurality of user data items is configured to be validated based on a respective one of the plurality of integrity data items. The electronic device invalidates the integrity data in the second memory block, and reads the user data from the first memory block independently of the integrity data.

20 Claims, 7 Drawing Sheets

(56) References Cited

U.S. PATENT DOCUMENTS

| | | | |
|---|---|---|---|
| 2014/0337666 A1 * | 11/2014 | Resch | G06F 15/16 |
| | | | 711/163 |
| 2017/0160934 A1 | 6/2017 | Park et al. | |
| 2017/0185348 A1 | 6/2017 | Byun | |
| 2019/0004888 A1 | 1/2019 | Chagam Reddy | |
| 2020/0264973 A1 | 8/2020 | Lee | |
| 2022/0358011 A1 * | 11/2022 | Amaki | G06F 12/1458 |
| 2022/0365720 A1 | 11/2022 | Basu | |
| 2022/0413718 A1 | 12/2022 | Lee | |

OTHER PUBLICATIONS

SK Hynix NAND Product Solutions Corp. (dba Solidigm), PCT/US2024/016954, International Search Report and Written Opinion, Aug. 15, 2025, 5 pgs.

Athreya et al., Notice of Allowance, U.S. Appl. No. 18/113,495, Jun. 17, 2024, 9 pgs.

* cited by examiner

_300_

| Block | Die0 206-0 | | | | Die1 206-1 | | | |
|---|---|---|---|---|---|---|---|---|
| | Plane 0 208-0 | Plane 1 208-1 | Plane 2 208-2 | Plane 3 208-3 | Plane 0 208-4 | Plane 1 208-5 | Plane 2 208-6 | Plane 3 208-7 |
| Page 0 210-0 | 16K data | 16K data | 16K data | 16K data | 16K data | 16K data | 16K data | _16K Integrity Data_ |
| Page 1 210-1 | 16K data | 16K data | 16K data | 16K data | 16K data | 16K data | 16K data | _16K Integrity Data_ |
| .. | .. | .. | .. | .. | .. | .. | .. | .. |
| Page N 210-N | 16K data | 16K data | 16K data | | | | | _16K Integrity Data_ |

306

302             304

<u>700</u>

At an electronic device having a memory system, the memory system having a first memory block and a second memory block, each memory block including one or more respective memory dies <u>702</u>

Store user data including a plurality of user data items in the first memory block, each of the user data items configured to be validated based on a respective one of a plurality of integrity data items <u>704</u>

Store the user data in a third memory block that is distinct from the first and second memory blocks <u>718</u>

Read back the user data from the third memory block <u>720</u>

Determine that the user data read from the third block is invalid based on the integrity data stored in the second memory block <u>722</u>

Duplicate the user data from the third memory block to the first memory block <u>724</u>

Correct the user data in the first memory block based on the integrity data <u>726</u>

Purge the user data in the third memory block <u>728</u>

Store integrity data including the plurality of integrity data items in the second memory block, each memory die of the second memory block distinct from the first memory block <u>706</u>

Read back the user data from the first memory block <u>712</u>

Determine that the user data are valid based on the integrity data, wherein the integrity data in the second memory block are invalidated in accordance with a determination that the user data is valid based on the plurality of integrity data <u>714</u>

Invalidate the integrity data in the second memory block <u>708</u>

Discard the integrity data in the second memory block <u>716</u>

Read the user data from the first memory block independently of the integrity data <u>710</u>

Copy the user data from the first memory block to a fourth memory block without the integrity data, the first memory block including a plurality of SLCs, the memory system further including a fourth memory block, the fourth memory block including a plurality of QLCs <u>730</u>

Figure 7

CONTROLLING MEMORY OVERHEAD FOR STORING INTEGRITY DATA IN SOLID STATE DRIVES

RELATED APPLICATION

This application is a continuation of, and claims benefit of, U.S. patent application Ser. No. 18/113,495, filed Feb. 23, 2023, titled "Controlling Memory Overhead for Storing Integrity Data in Solid State Drives," which is incorporated by reference in its entirety.

TECHNICAL FIELD

This application relates generally to memory management including, but not limited to, methods, systems, devices, and non-transitory computer-readable media for storing user data in a memory device with high fidelity while saving overhead memory space from storage of integrity data.

BACKGROUND

Memory is applied in a computer system to store instructions and data, and the data are processed by one or more processors according to the instructions stored in the memory. Primary memory (e.g., registers and caches) is used within the one or more processors to support calculations and operations on data in real time. The one or more processors are coupled via a memory bus to main memory that often includes random access memory (RAM). The main memory provides instructions and data to the one or more processors if the instructions and data cannot be found in the primary memory. Both the primary and main memory are volatile memory that needs to be regularly refreshed and loses data stored thereon if decoupled from a power source. Additionally, the one or more processors are further coupled to secondary memory (e.g., hard disk drives (HDDs) or solid-state drives (SSDs)), which is non-volatile memory that keeps data stored thereon if decoupled from a power source. Each data item in the memory is oftentimes stored in association with integrity data, and validated based on the integrity data when the respective data item is extracted from the memory. The integrity data are stored in additional memory blocks in the memory and causes overprovisioning of the memory, e.g., by 4-5% of memory space of the SSDs. During an internal copy back operation, the integrity data is copied over as dummy data jointly with the data items, thereby compromising efficiency of the copy back operation. It would be beneficial to manage data protection and validation effectively and efficiently to reduce associated overprovisioning space and dummy data operations in a memory system.

SUMMARY

Various embodiments of this application are directed to methods, systems, devices, non-transitory computer-readable media for managing data protection and validation in a memory system (e.g., SSDs, HDDs). User data and associated integrity data is stored in two distinct memory blocks that are located in two distinct memory blocks of the memory system. After the user data and integrity data is stored, the user data is read back, and validity of the user data is checked with respect to the integrity data. In accordance with a validation of the user data, the corresponding integrity data is invalidated and discarded from the memory system. Conversely, in accordance with an invalidation of the user data, the user data is corrected based on the integrity data. Subsequent to correction of the user data, the corresponding integrity data is invalidated and discarded from the memory system. By these means, the memory system validates the user data in advance, and discards the integrity data after the user data are validated or corrected. The memory system does not need to reserve large amount of dedicated memory space for storing the integrity data, nor does it need to implement additional data migration operations on the integrity data with the user data.

In an example, XOR logic is applied in memory management policies to validate user data and protect user data against NAND defects in an SSD. XOR-based integrity data are stored in memory space that needs to be addressed with overprovisioning availability in NAND memory blocks of the SSD. In some implementations, the XOR-based integrity data is invalidated and discarded from the SSD, thereby saving the memory space (e.g., by 90%) used for storing the XOR-based integrity data. The XOR-based parity data is stored in a memory block that does not store any user data. In some situations, the memory block is closed and then re-purposed to an open memory block for storing additional user data. In some embodiments, the XOR logic generates each integrity data item based on a subset of user data having an XOR parity size (e.g., corresponding to a quarter of a memory plane, a half of a memory plane, a memory plane, or a memory die). The XOR-based integrity data is invalidated and discarded from the SSD independently of the XOR parity size. Firmware programs are scaled based on the XOR parity size.

In one aspect, a method is implemented at an electronic device to store and protect data in a memory system (e.g., an SSD) of the electronic device. The memory system has a first memory block and a second memory block, and each memory block includes one or more respective memory dies. The method includes storing user data including a plurality of user data items in the first memory block, and each of the plurality of user data items is configured to be validated based on a respective one of a plurality of integrity data items. The method further includes storing integrity data including the plurality of integrity data items in the second memory block, and each memory die of the second memory block is distinct from the one or more respective dies of the first memory block. The method further includes invalidating the integrity data in the second memory block and reading the user data from the first memory block independently of the integrity data.

In some embodiments, the method further includes before invalidating the integrity data in the second memory block, reading back the user data from the first memory block, determining that the user data is valid based on the integrity data, and discarding the integrity data in the second memory block. The integrity data in the second memory block is invalidated in accordance with a determination that the user data is valid based on the integrity data.

In some embodiments, the method further includes prior to storing the user data in the first memory block, storing the user data in a third memory block that is distinct from the first and second memory blocks, reading back the user data from the third memory block, and determining that the user data read from the third block is invalid based on the integrity data stored in the second memory block. Further, in some embodiments, storing the user data in the first memory block further includes, in accordance with a determination that a subset of the user data stored in the third memory block is invalid, duplicating the user data from the third memory block to the first memory block, correcting the user data in the first memory block based on the integrity data, and purging the user data in the third memory block.

In another aspect, some implementations include an electronic device that includes one or more processors and memory having instructions stored thereon, which when executed by the one or more processors cause the processors to perform any of the above methods to store and protect data in a memory system having a first memory block and a second memory block.

In yet another aspect, some implementations include a non-transitory computer readable storage medium storing one or more programs. The one or more programs include instructions, which when executed by one or more processors cause the processors to implement any of the above methods to store and protect data in a memory system having a first memory block and a second memory block.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 7 is a flow diagram of another example data storage method, in accordance with some embodiments of the present invention.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
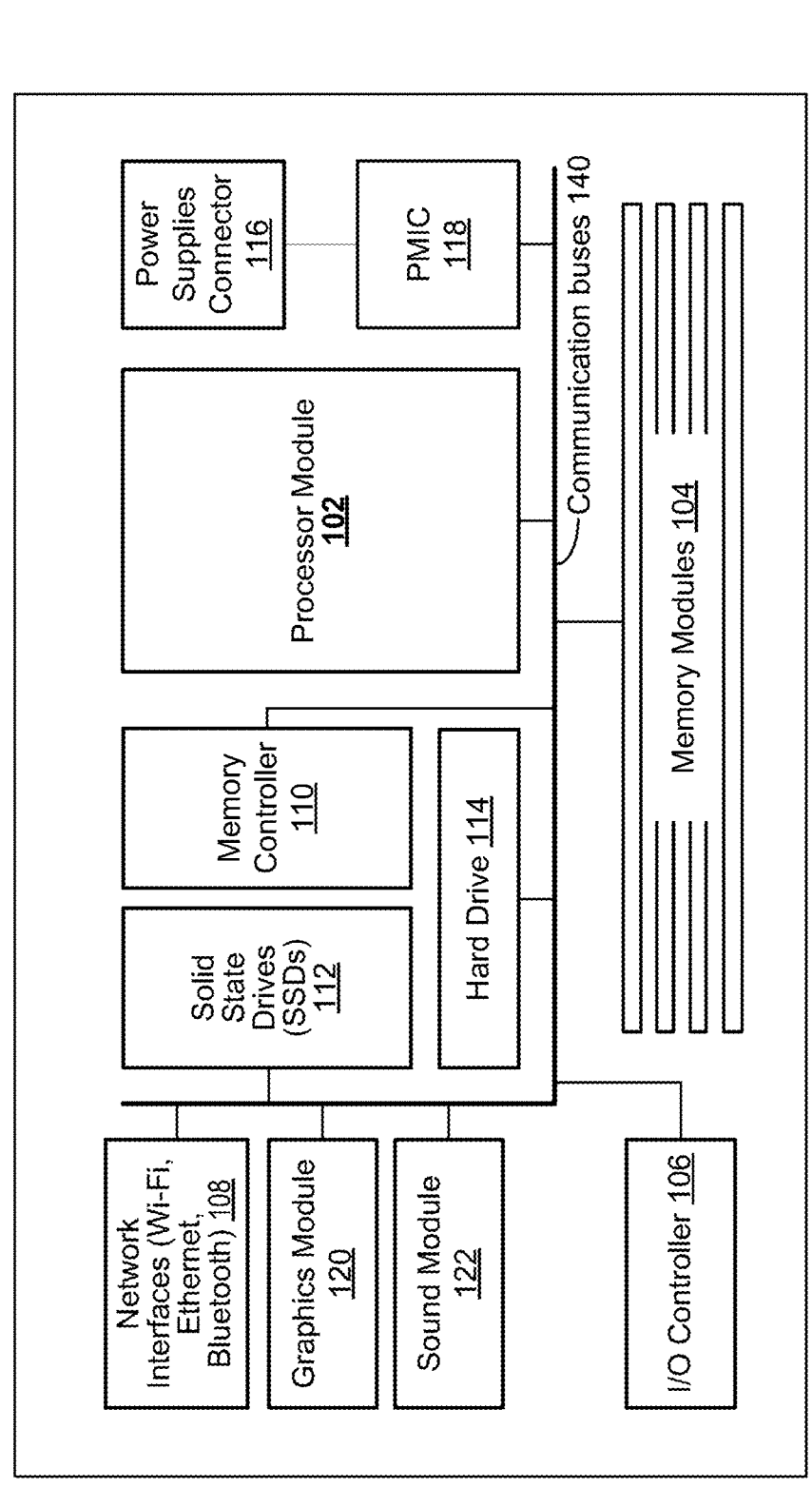
FIG. 1 is a block diagram of an example system module in a typical electronic device in accordance with some embodiments of the present invention.

FIG. 1 is a block diagram of an example system module 100 in a typical electronic device in accordance with some embodiments. The system module 100 in this electronic device includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic device to exchange data with an external source, e.g., a server or another electronic device. In some embodiments, the communication buses 150 include circuitry (sometimes called a chipset) that interconnects and controls communications among various system components included in system module 100.

In some embodiments, the memory modules 104 include high-speed random access memory, such as dynamic random access memory (DRAM), static random-access memory (SRAM), double data rate (DDR) random access memory (RAM), or other random access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, solid state drives (SSDs) 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic device. The SSDs 112 are configured to apply integrated circuit assemblies to store data in the electronic device, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic device. The graphics module 120 is configured to generate a feed of output images to one or more display devices according to their desirable image/video formats. The sound module 122 is configured to facilitate the input and output of audio signals to and from the electronic device under control of computer programs.

It is noted that communication buses 150 also interconnect and control communications among various system components including components 110-122.

Further, one skilled in the art knows that other non-transitory computer readable storage media can be used, as new data storage technologies are developed for storing information in the non-transitory computer readable storage media in the memory modules 104, SSDs 112, and/or, hard drive 114. These new non-transitory computer readable storage media include, but are not limited to, those manufactured from biological materials, nanowires, carbon nanotubes and individual molecules, even though the respective data storage technologies are currently under development and yet to be commercialized.

Some implementations of this application are directed to managing data protection and validation effectively and efficiently to reduce associated overprovisioning space and dummy data operations in a memory system (e.g., SSDs 112, memory module 104) of the system module 100. User data and associated integrity data are stored in two distinct memory blocks of the memory system. After the user data and integrity data are stored, the user data is read back, and validity of the user data is checked with respect to the integrity data. In accordance with a validation of the user data, the corresponding integrity data is invalidated and discarded from the memory system. Conversely, in accordance with an invalidation of the user data, the user data is corrected based on the integrity data, and the corresponding integrity data is subsequently invalidated and discarded from the memory system. By these means, the memory system validates the user data prior to receiving any read request for the user data, and discards the integrity data after the user data is validated or corrected. The system module 100 does not need to reserve large amount of dedicated memory space for storing the integrity data in the SSD 112 or memory modules 104, nor does it need to implement additional data migration operations on the integrity data when the user data needs to be migrated (e.g., in an internal copyback).

Figure 2:
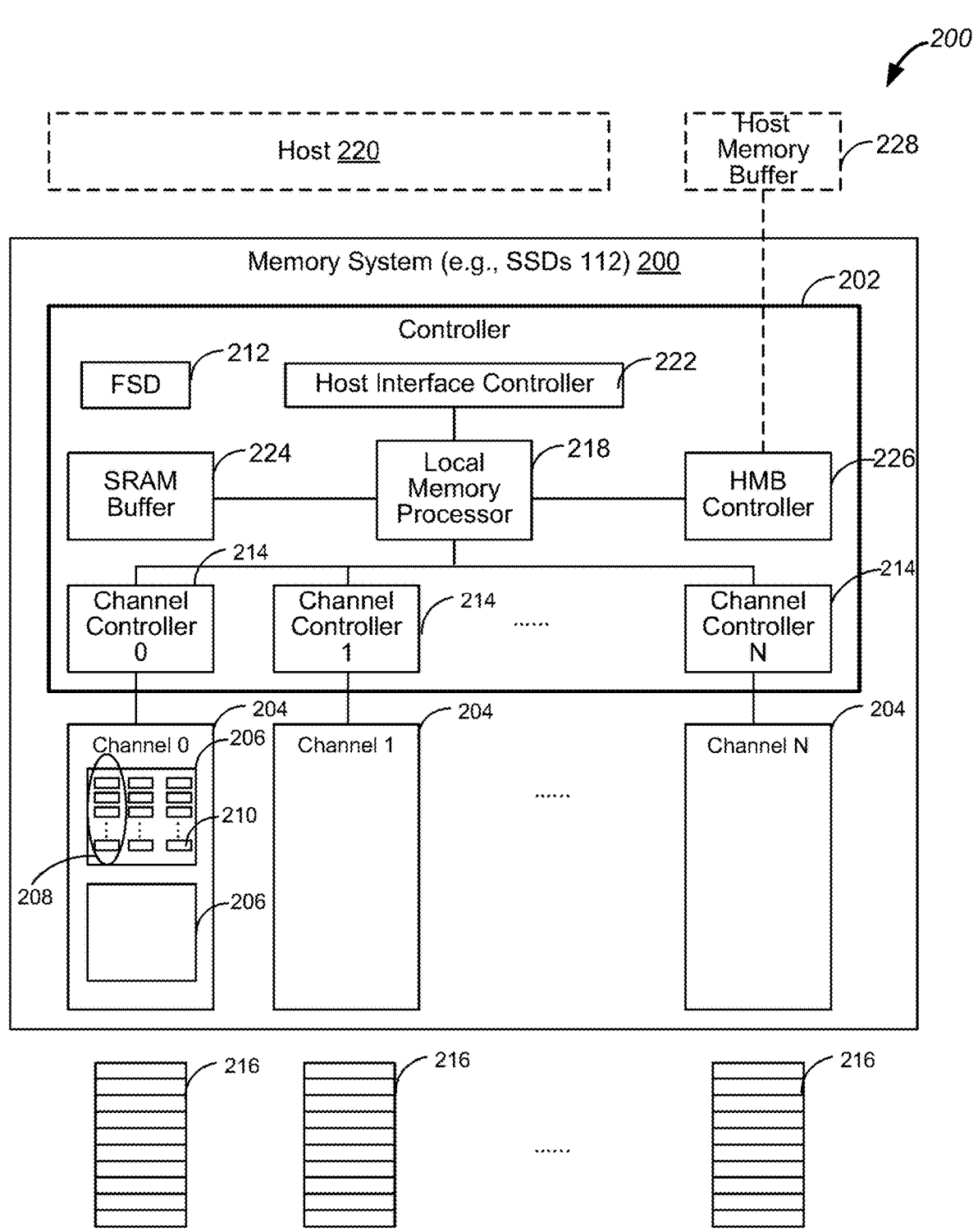
FIG. 2 is a block diagram of a memory system of an example electronic device having one or more memory access queues, in accordance with some embodiments of the present invention.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204. Each memory channels 204 includes a plurality of memory cells. The controller 202 is configured to executes firmware level software to bridge the plurality of memory channels 204 to the host device 220. Specifically, the controller 202 is configured to communicate with the host device 220, manage a file system directory (FSD) 212 for tracking data locations in the memory channels 204, organize the plurality of memory channels 204, and facilitate internal and external requests to access the memory channels 204.

Each memory channels 204 includes on one or more memory packages 206 (e.g., two memory chips, two memory dies). In an example, each memory package 206 corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a single layer cell (SLC) memory system, and each memory cell stores a single data bit. In some embodiments, the memory system 200 includes an MLC memory system, and each memory cell stores a plurality of data bits. In an example, each memory cell of a multi-level cell (MLC) memory system stores 2 data bits. In an example, each memory cell of a triple-level cell (TLC) memory system stores 3 data bits. In another example, each memory cell of a quad-level cell (QLC) memory system stores 4 data bits. In yet another example, each memory cell of a penta-level cell (PLC) memory system stores 5 data bits. In some embodiments, each memory cell can store any suitable number of data bits by a six- or higher-level memory cell. Compared with the MLC, TLC, QLC, or PLC memory system, the SLC memory system operates with a higher speed, a higher reliability, and a longer lifespan, and however, has a lower device density and a higher price. In some embodiments, each of the SLC, MLC, TLC, QLC, PLC, or six- or higher-level cell memory system includes one or more SSDs.

Each memory channel 204 is coupled to a respective channel controller 214 configured to control internal and external requests to access memory cells in the respective memory channel 204. In some embodiments, each memory package 206 (e.g., each memory die) corresponds to a respective queue 216 of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 correspond to a distinct queue 216 of memory access requests. In some embodiments, all of the plurality of memory channels 204 of the memory system 200 correspond to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204.

Further, in some embodiments, a queue 216 of memory access requests includes a memory read queue that includes only system read requests, host read requests, or a combination thereof. Alternatively, in some embodiments, a queue 216 of memory access requests includes a mixed memory access queue that includes at least a write request and a read request, while the write request is optionally a system write request or a host write request and the read request is optionally a system read request or a read write request.

A memory workload of the memory system 200 includes the one or more queues 216 of memory access requests. In some embodiments, the memory workload includes a host read workload that starts with host read requests, and does not include any host write requests. The memory workload further incorporates system read requests, system write requests, or both, and the one or more queues 216 include the host read requests and one or more of: a system read request, a system write request, or a combination thereof. Alternatively, in some embodiments, the memory workload includes a host write workload, and incorporates in which the one or more queues 216 include only system write requests that starts with host write requests, and does not include any host read requests. The memory workload further incorporates system read requests, system write requests, or both, and the one or more queues 216 include the host write requests and one or more of: a system read request, a system write request, or a combination thereof. Additionally and alternatively, in some embodiments, the memory workload includes a mixed host workload further having both host read requests and host write requests, and further incorporates system read requests, system write requests, or both. The one or more queues 216 include at least a write request and a read request, while the write request is optionally a system write request or a host write request and the read request is optionally a system read request or a read write request.

It is noted that system read requests (also called background read requests or non-host read requests) and system write requests are dispatched by a memory controller to implement internal memory management functions including, but are not limited to, garbage collection, read disturb, memory snapshot capturing, memory mirroring, caching, and memory sparing.

In some embodiments, in addition to the FSD 212 and channel controllers 214, the controller 202 further includes a local memory processor 218, a host interface controller 222, an SRAM buffer 224, and a home memory buffer (HMB) controller 226. The local memory processor 218 accesses the plurality of memory channels 204 based on the one or more queues 216 of memory access requests. In some embodiments, the local memory processor 218 writes into and read from the plurality of memory channels 204 on a memory chunk basis. Data of one or more memory chunks is written into, or read from, the plurality of channels jointly. No data in the same memory chunk is written via more than one operation. Each memory chunk optionally corresponds to one or more memory pages 210. In an example, each memory chunk to be written or read jointly in the plurality of memory channels 204 has a size of 16 KB (e.g., one memory page 210). In another example, each memory chunk to be written or read jointly in the plurality of memory channels 204 has a size of 64 KB (e.g., four memory pages 210). In some embodiments, each memory page 210 has 16 KB user data and 2 KB metadata. Additionally, a number of memory chunks to be accessed jointly and a size of each memory chunk are configurable for each of the system read, host read, system write, and host write operations. Stated another way, the number of memory chunks to be accessed jointly and the size of each memory chunk are not limited by the examples shown in this application, and can have different sizes that are not detailed in this application.

In some embodiments, the local memory processor 218 temporarily stores data to be written into, or data read from, the memory channels 204 in an SRAM buffer 224 of the controller 202. Alternatively, in some embodiments, the local memory processor 218 is coupled to the HMB controller 226, and temporarily stores the data to be written into, or the data read from, the memory channels 204 in a host memory buffer (HMB) 228 via the HMB controller 226 or host interface controller 222. The HMB 228 is external to the controller 202, and is main memory used by the processor module 102 (FIG. 1). In some embodiments, the HMB 228 is one of SRAM, DRAM, 3D XPOINT, and magnetoresistive RAM (MRAM), or other RAM devices. Further, in some embodiments, the memory system 200 includes an SSD coupled to a DRAM based HMB 228. Alternatively, in some embodiments, the memory system 200 includes an SSD coupled to an HMB 228, which does not include DRAM.

Figure 3:
FIG. 3 is a diagram illustrating a data structure of user data that is stored jointly with integrity data in a memory block of a memory system, in accordance with some embodiments of the present invention.

FIG. 3 is a diagram illustrating a data structure 300 of user data 302 that is stored jointly with integrity data 304 in a memory block 306 of a memory system 200 (e.g., an SSD 112), in accordance with some embodiments. The integrity data 304 is generated from the user data 302 based on a parity check scheme (e.g., using XOR logic) and applied to verify validity of the user data 302. The user data 302 includes a plurality of user data items, and the integrity data 304 includes a plurality of integrity data items. The user data 302 and the integrity data 304 are temporarily stored in an SRAM buffer 224 of a controller 202 of a memory system 200 (e.g., an SSD 112) or an HMB 228 external to the controller 202 (FIG. 2). In some embodiments, the user data 302 and the integrity data 304 are stored in two separate regions of the SRAM buffer 224. After storing the user data 302 and the integrity data 304 temporarily in the SRAM buffer 224 or the HMB 228, the controller 202 moves the user data 302 and the integrity data 304 into the memory block 306 of the memory system 200 (e.g., an SSD 112). In some situations, the memory block 306 is entirely filled with the user data 302 and the integrity data 304 copied from the SRAM buffer 224 or the HMB 228. Alternatively, in some situations, a first subset of the memory block 306 is filled with the user data 302 and the integrity data 304, and a second subset of the memory block 306 is left empty as the memory block 306 is closed (i.e., no more data can be written into the memory block 306). For example, last memory pages 210-3 of the memory planes 208-3 to 208-7 are empty.

In accordance with the data structures 300, the memory block 306 includes a plurality of memory pages 210. The plurality of memory pages 210 are distributed on a first number L of memory dies 206. Each memory die 206 has a second number M of memory planes 208 (e.g., 208-0 to 208-7), where M is equal to 8 in FIG. 3. Each memory plane 208 corresponds to a third number N of memory pages 210 (e.g., 210-0 to 210-N). Each of the first number L, the second number M, and the third number N is a positive integer number. In this example, the first number L, the second number M, and the third number N are equal to 2, 8, and 4, respectively, and the memory block 306 includes 64 memory pages in total. Each super page or stripe includes a row of pages 210. In some embodiments, each super page or stripe is identified by one physical address when a controller 202 accesses the memory cells in the memory system 200. In some embodiments, each super page or stripe is a basic memory unit, and a plurality of super pages or stripes are identified jointly by one physical address when the controller 202 accesses the memory cells in the memory system 200.

Referring to FIG. 3, in some embodiments, one or more last pages 210 of each super page or strip are used to store the integrity data 304, while remaining pages 210 of each super page or strip are used to store the user data 302. Specifically, each row of memory pages 210 (e.g., a super page or stripe 210-0) corresponds to a subset of the user data 302 and a subset of the integrity data 304. The subset of the user data 302 is stored in the respective row of memory pages 210 (e.g., the super page 210-0) on a first subset of memory planes 208 (e.g., 208-0 to 208-6), and the subset of the integrity data 304 is stored in the respective row of memory pages 210 (e.g., 210-0) on a second subset of distinct memory planes 208 (e.g., 208-7). In some embodiments, each user data item of the user data 302 has a data item size (e.g., 32 bits) and is stored with an integrity data item having an integrity item size (4 bits). For example, each user data item of the user data 302 is stored in a corresponding memory page 210-0 on any of memory planes 208-0 to 208-6, and its corresponding integrity data item is stored in the same memory page 210-0 of the memory plane 208-7. In some embodiments, XOR logic is applied to generate the integrity data item for each user data item of the user data 302. Every 8 bits of the user data item of the user data 302 are combined using the XOR logic to determine a parity bit of the integrity data item of the integrity data 304.

In some embodiments, for each memory block 306, the user data 302 and the integrity data 304 are provided by a host device 220 coupled to the memory system 200 (FIG. 2), and prepared in the SRAM buffer 224 by the controller 202. While the user data 302 is written to the SRAM buffer 224, the integrity data 304 is determined based on each individual user data item (e.g., 32 bits, 64 bits), user data 302 to be stored in each memory page 210 (e.g., 16 KB), or user data 302 to be stored in each row of memory pages 210. Stated another way, each integrity data item of the integrity data 304 is generated based on a data chunk having a configurable size (e.g., 4 KB, 8 KB, 16 KB, or any other suitable sizes) and a number of data chunks of the user data 302. In some embodiments, the user data 302 and the integrity data 304 are stored in two separate SRAM buffers 224. In some embodiments, the user data 302 is further encoded by a low-density parity-check (LDPC) engine and based on an LDPC coding scheme. Each of the user data items of the user data 302 corresponds to a respective one of the integrity data items of the integrity data 304. Each of the user data items of the user data 302 is coded by the LDPC engine to generate a respective LDPC code, and the respective one of the integrity data items of the integrity item of the integrity data 304 includes the LDPC code. The user data 302 and the associated integrity data 304 stored in the SRAM buffer 224 is copied jointly to, and coexist in a memory block 306 of the memory system 200 (e.g., the SSD 112).

Specifically, for example, on each row of memory pages 210 of the memory block 306, the user data 302 is stored in the first subset of memory planes 208-0 to 208-6, and the integrity data 304 corresponding to the user data 302 on the same row is stored in the last memory plane 208-7. As such, the user data 302 and the corresponding integrity data 304 is stored jointly in the same memory block 306 of the memory system 200 on a super page basis or on a block-by-block basis.

Figure 4:
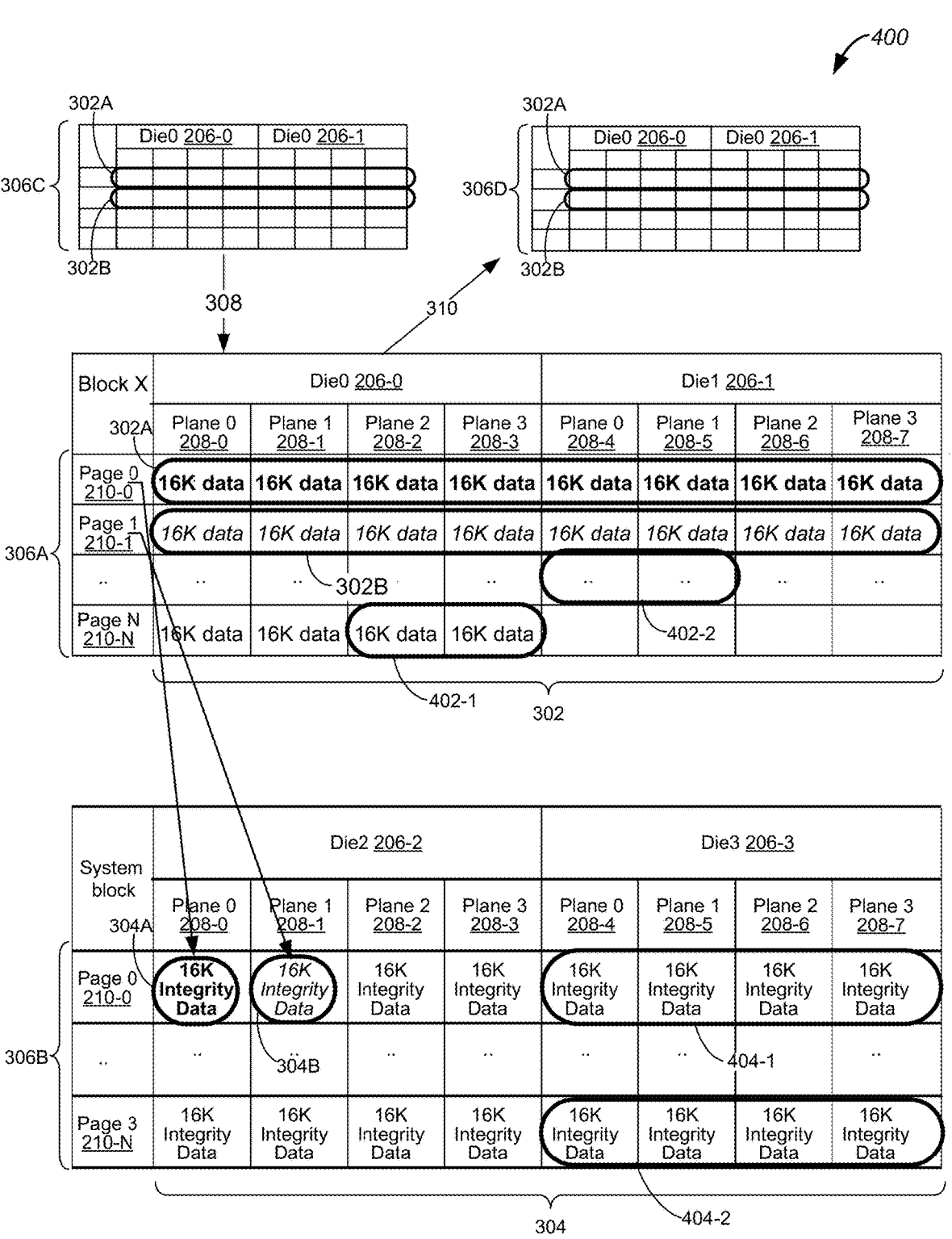
FIG. 4 is a diagram illustrating a data structure of user data that is stored separately with integrity data in two distinct memory blocks of a memory system, in accordance with some embodiments of the present invention.

FIG. 4 is a diagram illustrating a data structure 400 of user data 302 that is stored separately with integrity data 304 in two distinct memory blocks 306A and 306B of a memory system 200 (e.g., an SSD 112), in accordance with some embodiments. The integrity data 304 is generated from the user data 302 based on a parity check scheme and applied to verify validity of the user data 302. The user data 302 and the integrity data 304 are temporarily stored in an SRAM buffer 224 or an HMB 228 (FIG. 2). In some embodiments, each of the two distinct memory blocks 306A and 306B corresponds to a respective distinct memory block in the SRAM buffer 224 or the HMB 228 (FIG. 2). The user data 302 is copied from respective distinct memory blocks of the SRAM buffer 224 or the HMB 228 to a first memory block 306A. The integrity data 304 is copied from respective distinct memory blocks of the SRAM buffer 224 to a second memory block 306B. After the user data 302 stored in the first memory block 306A of the memory system 200 is validated or corrected, the integrity data 304 corresponding to the user data 302 is invalidated and discarded in the second memory block 306B, allowing the second memory block 306B to repurposed for storage of additional user data 302 or integrity data 304.

In accordance with the data structures 400, each of the memory blocks 306A and 306B includes a plurality of memory pages 210. The plurality of memory pages 210 are distributed on a first number L of memory dies 206. Each memory die 206 has a second number M of memory planes 208 (e.g., 208-0 to 208-7, wherein M is equal to 8). Each memory plane 208 corresponds to a third number N of memory pages 210 (e.g., 210-0 to 210-N). Each of the first number L, the second number M, and the third number N is a positive integer number. In some embodiments, each memory die 206 (e.g., 206-0 or 206-1) of the first memory block 306A is distinct from memory dies 206 (e.g., 206-2 and 206-3) of the second memory block 306B, and each memory die 206 (e.g., 206-2 or 206-3) of the second memory block 306B is distinct from memory dies 206 (e.g., 206-0 and 206-1) of the first memory block 306A. No memory die belongs to both of the memory blocks 306A and 306B. In some situations, the first memory block 306A is entirely filled with the user data 302 copied from the SRAM buffer 224 or the HMB 228. Alternatively, in some situations, a first subset of the first memory block 306A is filled with the user data 302, and a second subset of the first memory block 306A is left empty. For example, a half of last memory pages 210-3 of the second number M of memory planes 208 are empty. In some situations, the second memory block 306B is entirely filled with the integrity data 304 copied from the SRAM buffer 224 or the HMB 228. Alternatively, in some situations, a first subset of the second memory block 306B is filled with the integrity data 304, and a second subset of the second memory block 306B is left empty.

In some embodiments FIG. 4, the first memory block 306A has a block size equal to that of the second memory block 306B. Alternatively, in some embodiments not shown, the first memory block 306A has a block size distinct from (e.g., larger than, smaller than) that of the second memory block 306B.

In some embodiments, the user data 302 stored in the first memory block 306A includes a plurality of user data sets 402 (e.g., a first user data set 402-1, a second user data set 402-2), and each user data set 402 is configured to occupy one or more respective first memory pages 210 (e.g., 2 memory pages). A number of memory pages in each user data set 402 is reconfigurable. User data in each user data set 402 is stored in the first memory block 306A jointly, e.g., in response to a write command. Successively and after obtaining each of the plurality of user data sets 402 in a buffer (e.g., the SRAM buffer 224, the HMB 228), the controller 202 stores the respective user data set 402 as a whole (e.g., jointly, in response to a respective write command) into the one or more respective memory pages 210 of the first memory block 306. In some embodiments, the integrity data 304 stored in the second memory block 306B includes a plurality of integrity data sets 404 (e.g., a first integrity data set 404-1, a second integrity data set 404-2), and each integrity data set 404 is configured to occupy one or more respective second memory pages 210 (e.g., 4 memory pages). A number of memory pages in each integrity data set 404 is reconfigurable. Integrity data in each integrity data set 404 is stored in the second memory block 306B jointly, e.g., in response a write command. Successively and after obtaining each of the plurality of integrity data sets 404 in a buffer (e.g., the SRAM buffer 224, the HMB 228), the controller 202 stores the respective integrity data set 404 as a whole (e.g., jointly, in response to a respective write command) into the one or more respective second memory pages 210 of the second memory block 306B.

For the first memory block 306A, a subset of user data 302 corresponds to, and is verified based on, a subset of integrity data 304 of the second memory block 306B. For example, the subset of user data 302 is stored in a row of memory pages 210 (also called a super page) distributed on the second number M of memory planes 208 of the first number L of memory dies 206 of the first memory block 306A. The subset of integrity data 304 is stored in a respective memory page 210 of a respective memory plane 208 of a memory die 206 of the second memory block 306B. In an example, the subset of user data 302A are stored in a first row of 8 memory pages (i.e., a first super page 210-0) of the first memory block 306A, and the subset of integrity data 304A corresponding to the subset of user data 302A is stored in a single memory page 210-0 on the memory plane 208-0 of the second memory block 306B. The subset of user data 302B is stored in a second row of 8 memory pages (i.e., a second super page 210-1) below the first row of the first memory block 306A, and the subset of integrity data 304B corresponding to the subset of user data 302B is stored in a single memory page 210-0 of a memory plane 208-1 immediately adjacent to the plane 208-0 of the second memory block 306B. Each memory page 210 in the memory blocks 306A and 306B has a page size of 16 KB. In some embodiments, XOR logic or a lookup table is applied to generate the integrity data item for each user data item. Every eight 16 KB memory pages 210 of the first memory block 306A corresponds to a 16 KB memory page 210 of the second memory block 306B.

After the user data 302 and the integrity data 304 are written into the first memory block 306A and the second memory block 306B, respectively, the controller 202 of the memory system 200 reads back the user data 302 from the first memory block 306A. In some situations, the controller 202 further determines that the user data 302 is valid based on the integrity data 304. In accordance with a determination that the user data 302 is valid based on the integrity data 304, the integrity data 304 is invalidated in, and discarded from, the second memory block 306B.

In some situation, before the user data 302 is stored in the first memory block 306A, the user data 302 is stored in a third memory block 306C that is distinct from the first and second memory blocks 306A and 306B. The user data 302 is read back from the third memory block 306C. The controller 202 of the memory system 200 determines that the user data 302 read from the third memory block 306C is invalid based on the integrity data 304 stored in the second memory block 306B. Further, in some embodiments, in accordance with a determination that a subset of the user data 302 stored in the third memory block 306C is invalid, the controller 202 duplicates (operation 308) the user data from the third memory block 306C to the first memory block 306A and corrects the user data 302 in the first memory block 306A based on the integrity data 304. The user data 302 is purged in the third memory block 306C. The user data 302 duplicated in the first memory block 306A is optionally read back and validated based on the integrity data 304 in the second memory block 306B. In accordance with a determination that the user data 302 is valid, the integrity data 304 is invalidated in the second memory block 306B, which is repurposed for storage of additional user data 302 or integrity data 304.

In some embodiments, the user data 302 stored in the first memory block 306A corresponds to a first subset (less than all) of the integrity data 304 stored in the second memory block 306B. The second memory block 306B are repurposed after all of the integrity data 304 stored in the second memory block 306B are invalidated, i.e., after validation of user data stored in the first memory block 306A and one or more additional memory blocks 306. Alternatively, in some embodiments, the second memory block 306B is partially filled, and the user data 302 stored in the first memory block 306A corresponds to all of the integrity data 304 stored in the second memory block 306B. The second memory block 306B is repurposed after the user data 302 of the first memory block 306A is validated. Alternatively and additionally, in some embodiments, the second memory block 306B is entirely filled by the integrity data 304 corresponding to the user data 302 of the first memory block 306A. The second memory block 306B is repurposed after the user data 302 of the first memory block 306A are validated.

After the integrity data 304 in the second memory block 306 is invalidated, the user data 302 is read from the first memory block 306A, independently of the integrity data 304. In some embodiments, the first memory block 306A includes a plurality of first cells of a first cell type (e.g., SLC). The memory system 200 further includes a fourth memory block 306D having a plurality of second cells of a second cell type (e.g., QLC). In an internal copyback 310, the user data 302 is copied from the first memory block 306A to the fourth memory block 306D without the integrity data 304. Each of the first and second cell types is a respective one of an SLC, MLC, TLC, QLC, PLC, and six- or higher-level cell, while the first cell type is distinct and different from the second cell type.

Figure 5:
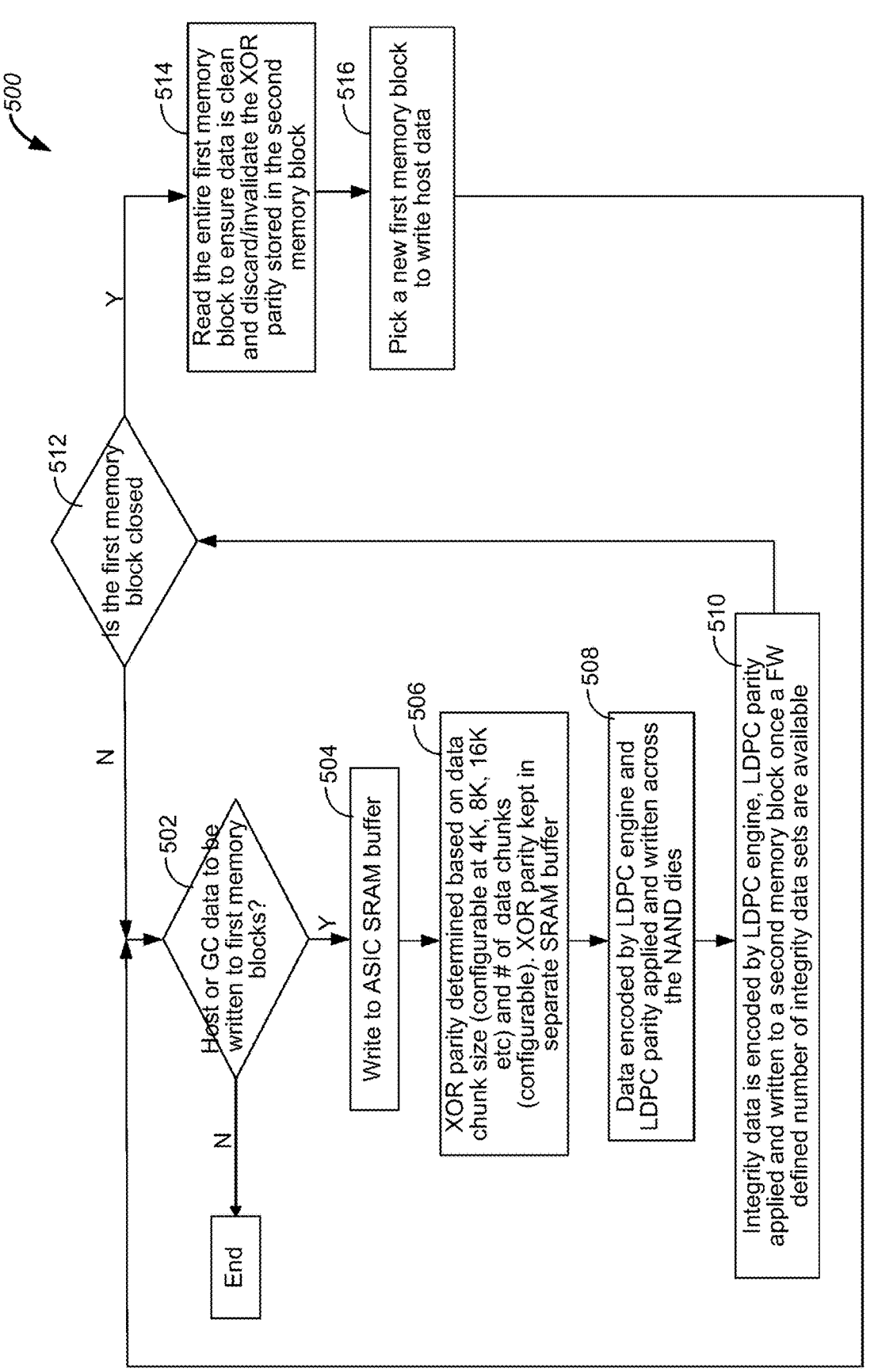
FIG. 5 is a flow diagram of an example data storage method, in accordance with some embodiments of the present invention.

FIG. 5 is a flow diagram of an example data storage method 500, in accordance with some embodiments. A host device 220 (e.g., a processor module 102 in FIG. 1) is coupled to a memory system 200 including a plurality of memory blocks 306. Each memory block 306 includes an SLC memory block. The host device 220 provides (operation 502) user data 302 to a controller 202 of the memory system 200. In some embodiments, the controller 202 writes (operation 504) the user data 302 temporarily in an SRAM buffer 224 (FIG. 2) in the controller 202. Alternatively, in some embodiments, the controller 202 writes the user data 302 temporarily in an HMB 228 (FIG. 2) external to the controller 202.

The controller 202 of the memory system 200 determines (operation 506) integrity data 304 that corresponds to the user data 302 and is applicable to verify the user data 302. The user data 302 includes a configurable first number of data chunks, and each data chunk has a configurable first chunk size (e.g., 4 KB, 8 KB, 16 KB). The integrity data 304 corresponding to the user data 302 includes a configurable second number of data chunks, each of which has a configurable second chunk size (e.g., 4 KB, 8 KB, 16 KB). The configurable second number (e.g., 8) is optionally equal to or different from the configurable first number (e.g., 32). The configurable second chunk size (e.g., 4 KB) is optionally equal to or different from the configurable first chunk size (e.g., 16 KB). In an example, XOR logic is applied to generate an integrity data item for each user data item. Every 8 bits of the user data item are combined using the XOR logic to determine the parity check unit of the integrity data 304. In some embodiments, the integrity data 304 is stored in the same buffer 224 or 228 (FIG. 2) with the user data 302.

Alternatively, the integrity data 304 and the user data 302 is stored separately in the SRAM buffer 224 and the HMB 228 (FIG. 2).

In some embodiments, the user data 302 is further encoded (operation 508) by an LDPC engine to generate the integrity data 304 based on an LDPC coding scheme. The user data 302 is written to a first memory block 306A of the memory system 200 (e.g., the SSD 112), and the integrity data 304 corresponding to the user data 302 is copied to a second memory block 306B of the memory system 200 (e.g., the SSD 112). In an example, each memory cell on the memory block 306 includes an SLC and is formed based a NAND logic. Each memory cell may have two or more levels. Further, in some situations, XOR logic is implemented by the LDPC engine to encode the user data 302 and generate LDPC codes as the integrity data 304. As such, the integrity data 304 corresponding to the user data 302 includes the LDPC codes, and is written into the second memory block 306B.

The integrity data 304 includes a plurality of integrity data sets 404 (FIG. 4), and each integrity data set 404 is configured to occupy one or more respective second memory pages 210 in the second memory block 306B. Integrity data in each integrity data set 404 is stored in the second memory block 306B jointly, e.g., in response a write command. In some embodiments, when a predefined number of integrity data sets 404 are available, integrity data of the integrity data sets 404 is written (operation 510) to the second memory block 306B. In some embodiments, the user data 302 of the first memory block 306A is encoded by an LDPC engine and based on an LDPC coding scheme. Each of the user data items of the user data 302 corresponds to a respective one of the integrity data items of the integrity data 304 of the second memory block 306B. Each of the user data items of the user data 302 in the first memory block 306A is coded by the LDPC engine to generate a respective LDPC code, and the respective one of the integrity data items of the integrity item of the integrity data 304 in the second memory block 306B includes the LDPC code. In some embodiments, the integrity data 304 in the second memory block 306B includes XOR parity. In some embodiments, the integrity data 304 in the second memory block 306B includes both the LDPC code and XOR parity associated with the user data 302 stored in the first memory block 306A.

The second memory block 306B is closed when integrity data sets 404 fill the second memory block 306B or when the second memory block 306B does not need to be entirely filled. In some embodiments, a firmware application is applied to control the predefined number of integrity data sets 404 that are written to the second memory block 306B in each write operation. In some embodiments, the second memory block 306B stores only the integrity data 304 associated with the user data 302 stored in the first memory block 306A. Alternatively, in some embodiments, the second memory block 306B stores the integrity data 304 associated with the user data 302 stored in the first memory block 306A and one or more additional memory blocks 306.

In some embodiments, readback and data validation are implemented as the first memory block 306A is closed for additional data storage. The second memory block 306B does not need to be closed for storing additional integrity data distinct from the integrity data 304 associated with the user data 302 of the first memory block 306A. However, the integrity data 304 associated with the user data 302 stored in the first memory block 306A should have been written into the second memory block 306B.

In accordance with a determination that the first memory block 306A used to store the user data 302 has not been closed (operation 512), more user data 302 and integrity data 304 are generated (operations 502-510) to be written into the first memory block 306A and the second memory block 306B, respectively, until the first memory block 306A is closed. In accordance with a determination that the first memory block 306A used to store the user data 302 has been closed (operation 512), the integrity data 304 corresponding to the first memory block 306A has been copied from the buffer 224 or 228 to the second memory block 306B. The user data 302 in the first memory block 306A is read back (operation 514) from the first memory block 306A and validated based on the corresponding integrity data 304 stored in the second memory block 306B. The integrity data 304 corresponding to the user data 302 stored in the first memory block 306A is invalidated, in accordance with a determination that the user data 302 is valid. Subsequently, the integrity data 304 is discarded. After all of the integrity data 304 stored in the second memory block 306B is invalidated, the second memory block 306B is repurposed for storing additional user data 302 or integrity data 304.

After integrity data 304 stored in the second memory block 306B is invalidated and discarded, the controller 202 of the memory system 200 repeats operations 502-516 to store user data 302 provided by the host device 220 in a next first memory block 306A (FIG. 2). The next first memory block 306A of user data 302 is validated based on a next second memory block 306B storing corresponding integrity data 304, and however, not stored jointly with the corresponding integrity data 304. Upon validation of the next first memory block 306A of user data 302, the next second memory block 306B of integrity data 304 are also invalidated and discarded. By these means, the integrity data 304 is not stored to reduce overprovisioning of the memory system 202, and the integrity data 304 does not need to be copied during subsequent copyback operation on the user data 302.

In some embodiments, XOR parity check is one of the critical memory management functions implemented in SSDs 112 to protect data integrity against NAND defects. This function allows the firmware (FW) and application specific integrated circuit (ASIC) to recover the user data 302 using the integrity data 304 (e.g., the XOR parity) stored in the volatile media which is determined while writing the user data 302 to the NAND based memory cells of the SSDs 112. The XOR parity is determined optionally on a die level (e.g., 64 KB), a planar level (e.g., 16 KB), on a half plane level (e.g., 8 KB), or on a quarter plane level (e.g., 4 KB)). The quarter plane level uses lesser space (e.g., 4 KB) and has a lower correction capability compared with the planar level, which uses less space (e.g., 16 KB) and has a lower correction capability compared with the die level. The method 500 invalidates the integrity data 304, and is implemented, independently of any XOR Parity size requirement (e.g., on a half plane level, on a quarter plane level, or on a planar level).

Stated another way, in some embodiments, the electronic device divides user data 302 into a plurality of data chunks. Each data chunk has a data chunk size. The electronic device determines each integrity data item of a subset of integrity data 304 based on a subset of respective data chunks. The subset of respective data chunks includes a predefined number of data chunks of the user data 302 (e.g., 4 data chunks). For example, each data chunk corresponds to two memory pages 210, and each integrity data item corresponds to four data chunks (i.e., eight memory pages 210). In some embodiments, each of the plurality of integrity data items of the integrity data 304 is determined based on the subset of respective data chunks using an XOR logic or a lookup table. In some embodiments, for each of the plurality of user data items of the user data 302, the respective one of the plurality of integrity data items of the integrity data 304 is determined using an XOR logic or a lookup table.

In some embodiments, the method 500 is implemented based on a dynamic XOR policy to generate dynamic XOR parity data 304, which will be stored in a system block 306B (i.e., the second memory block 306B) while the user data 302 is being written to an SLC block 306A or TLC/QLC block during TLC/QLC direct program algorithm. The dynamic XOR parity data 304 is calculated at a super page granularity (e.g., for the first memory block 306A), stored in ASIC memory (e.g., buffer 224 or 228), and periodically flushed to non-volatile storage medium (system block 306B) during low power state transitions (including a power loss notification (PLN)). In some situations, the SRAM buffer 224 has a limited size, a host memory buffer (HMB) 228 is used to for storing the dynamic XOR parity data 304. The firmware uses direct addressing to match the user data 302 stored in the first memory block 306A to the corresponding parity data 304 stored in the system block 306B. This will ensure the parity data 304 is protected against power loss. Once the first memory block 306A is closed, the FW performs a full or partial block read (depends on NAND technology) to ensure data integrity before invalidating the XOR parity data 304 stored in the system block 306B. If there is a safe power cycle or low power state transition, the parity data 304 is dumped in the system block 306B and will be valid. Upon resume, if there is any error correction code (ECC) error detected in an open block, the integrity data 304 is used to recover the user data 302 and manage the bad block error handling scenario identical to traditional XOR policy implementation.

In some embodiments, the low power state transition is enabled in response to the PLN received by the controller 202 of the memory system 200. The PLN indicates that the system module 100 will disable a power supply and instructs the controller 202 to take necessary actions to store snapshots or current states of the memory system 200 including the plurality of memory channels 204. The snapshots and current states will be loaded to help the memory system 200 resume operations promptly after a low power state.

In some embodiments, an internal copy back (ICB) feature is supported by a NAND based SSD 112. The SSD 112 copies all the user data 302 from one first memory block 306A (source) to another block destination. When ICB is used, there is no distinction/intelligence built to differentiate valid vs invalid data on the first memory block 306A and entire block data is copied over into the destination block. As the total NVB (number of valid blocks) in QLC is diminishing, the overhead to maintain QLC XOR is higher, as a result the FW algorithm does not implement QLC XOR. In the architecture without adaptive XOR parity, the SLC parity is ported over to QLC during internal copy back. This data would not be ported if the internal copy back feature was not used. As a result, the validity of the TLC/QLC block is lower due to XOR parity data being present. This reduction can trigger QLC-to-QLC or TLC-to-TLC garbage collection (defrag) earlier (to free up some space in the TLC/QLC regions) resulting in performance drop to the end user. The adaptive XOR parity based method 500 becomes critical for ne TLC/QLC NAND based SSDs 112, ensures that no additional block is needed, and qualifies the NAND based SSD 112 for a faster memory operation. The spare SLC block storing parity (e.g., the second memory block 306B) will be wear leveled with the rest of the SLC data or system map blocks.

The method 500 is scalable to different types of memory systems 200, including but not limited to, an SSD 112 of a data center, an SSD 112 of a client device, and an automotive SSD segment. In some embodiments, the memory system 200 has XOR protection until a memory block 306 is open. Post closure relies on NAND reliability metrics. Margins are high for the SLC. This feature is implemented for the value segments with minimal impact. In some situations, post closure failures are triggered as read failures based on retention or disturb mechanisms.

In some embodiments, application of the method 500 is detected by sniffing a NAND interface bus and applying command sequence analysis.

Figure 6:
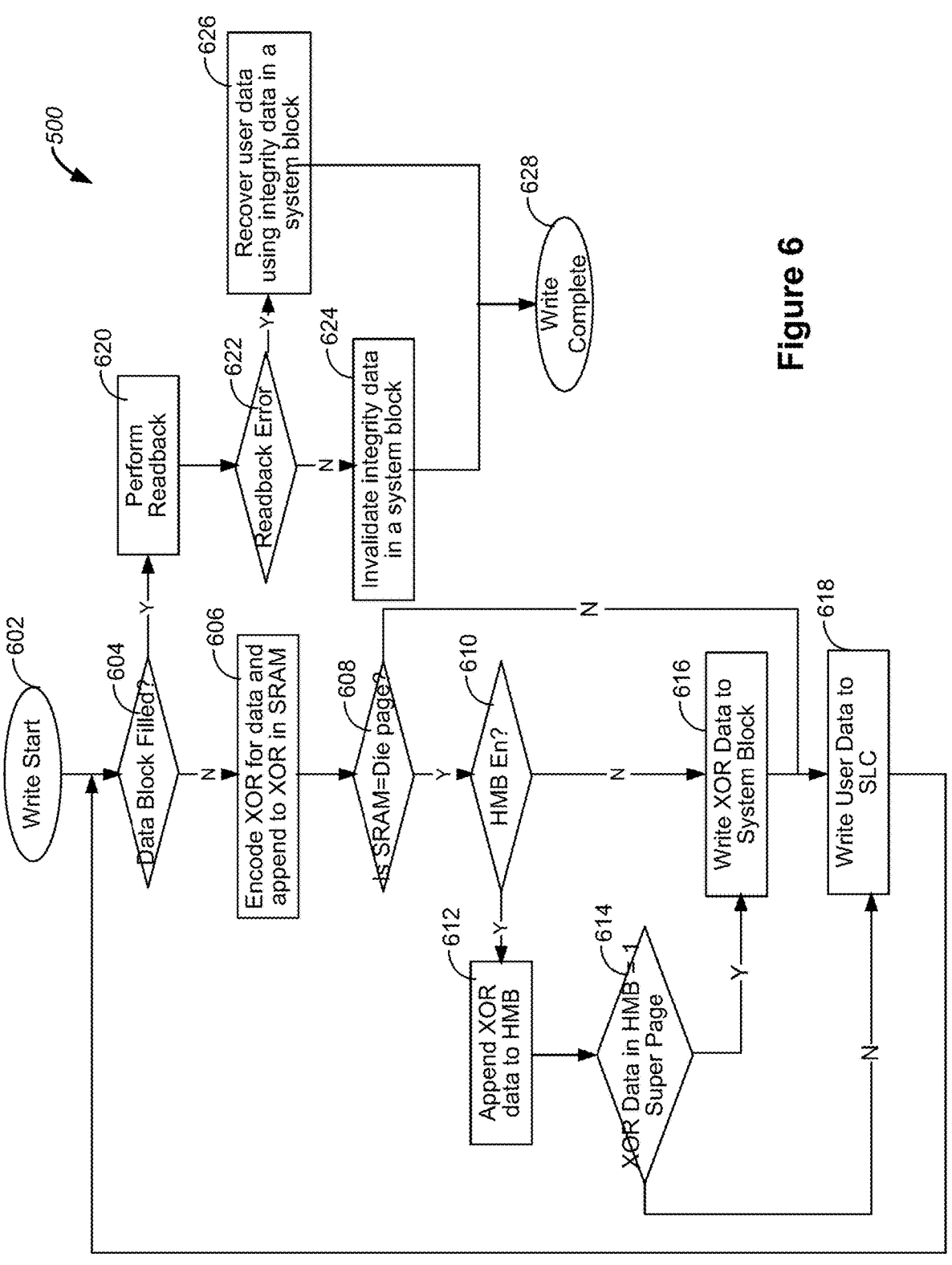
FIG. 6 is a flow diagram of an example data writing process of writing user data in a first memory block of a memory system, in accordance with some embodiments of the present invention.

FIG. 6 is a flow diagram of an example data writing process 600 of writing user data 302 in a first memory block 306A of a memory system 200 (e.g., an SSD 112), in accordance with some embodiments. A first memory block 306A is also called an SLC block, and a second memory block 306B is also called a system block. In some embodiments, the data writing process 600 is initiated (operation 602), e.g., in response to a data write request. A controller 202 of the memory system 200 determines (operation 604) whether the first memory block 306A has been closed for storing the user data 302. In some embodiments, the user data 302 fills the first memory block 306A. The controller 202 determines (operation 604) whether the user data 302 fill the first memory block 306A. Alternatively, in some embodiments, the user data 302 does not fill the first memory block 306A, and are stored in the first memory block 306A to partially fill the first memory block 306A. Once the first memory block 306A is closed, no more user data 302 are stored into the first memory block 306A.

In accordance with a determination that the first memory block 306A is not closed, more user data 302 needs to be obtained from a host device 220 (FIG. 2). While obtaining more user data 302 to be stored in the first memory block 306A, the controller 202 generates (operation 606) a subset of integrity data 304 (e.g., XOR based parity data) corresponding to the obtained user data 302, and temporarily stores the subset of integrity data 304 in the SRAM buffer 224. During the course of generating the integrity data 304, the controller 202 determines whether the integrity data 304 stored in the SRAM buffer 224 fills (operation 608) a first integrity data set 404 (e.g., a die page including 4 memory pages) predefined to be copied from the SRAM buffer 224 to the HMB 228 jointly. In accordance with a determination that the integrity data 304 stored in the SRAM buffer 224 fills the first integrity data set 404, the controller 202 further determines (operation 610) whether the HMB 228 is also used to store integrity data 304 for the second memory block 306B. In accordance with a determination that the HMB 228 is also used to store the integrity data 304 for the second memory block 306B, the integrity data 304 is moved (operation 612) to the HMB 228, e.g., to append to integrity data 304 that are already stored on the HMB 228, until it is determined (operation 614) that the integrity data 304 stored on the HMB 228 fills a second integrity data set 404 (e.g., a super page including 8 memory pages) predefined to be copied from the HMB 228 to the second memory block 306B jointly. Each second integrity data set 404 stored in the HMB 228 are written (operation 616) into the second memory block 306B. In some embodiments, the HMB 228 is not used to store integrity data for the second memory block 306B, the integrity data 304 stored in the SRAM buffer 224 bypass the HMB 228, and are written (operation 616) to the second memory block 306B. The user data 302 is temporarily stored (operation 618) in the SRAM buffer 224 for the first memory block 306A, and gradually written into the first memory block 306A.

In accordance with a determination that the first memory block 306A is not closed (e.g., no more user data 302 needs to be stored in the first memory block 306A), the controller 202 reads back (operation 620) the user data 302 from the first memory block 306A and determines (operation 622) whether there is a readback error. In accordance with a determination that there is no readback error, the integrity data 304 corresponding to the user data 302 in the first memory block 306A is invalidated (operation 624) in the second memory block 306B. Conversely, in accordance with a determination that there is a readback error, the integrity data 304 corresponding to the user data 302 in the first memory block 306A is identified (operation 626) in the second memory block 306B and applied to correct the readback error in the first memory block 306A. In some embodiments, when a readback error is detected in the user data 302 in the first memory block 306A, the user data 302 is duplicated from the first memory block 306A to the third memory block 306C and corrected in the third memory block 306C. The user data 302 in the first memory block 306A and corresponding integrity data 304 in the second memory block 306B are invalidated. Alternatively, in some embodiments, the user data 302 in a third memory block 306C (FIG. 4) is read back, and a readback error is detected in the user data 302 in the third memory block 306C. The user data 302 is duplicated from the third memory block 306C to the first memory block 306A and corrected in the first memory block 306A. The user data 302 in the third memory block 306C and corresponding integrity data 304 are invalidated. After the user data 302 in the first memory block 306A is validated or corrected, the writing operation is completed (operation 628).

FIG. 7 is a flow diagram of another example data storage method 700, in accordance with some embodiments. The method 700 is implemented (operation 702) at an electronic device having a memory system 200. The memory system 200 includes a first memory block 306A and a second memory block 306B. Each memory block 306 includes one or more respective memory dies 206 (e.g., two distinct dies 206-0 and 206-1 of the first memory block 306A in FIG. 4). The electronic device stores (operation 704) user data 302 including a plurality of user data items in the first memory block 306A. Each of the plurality of user data items of the user data 302 is configured to be validated based on a respective one of a plurality of integrity data items. The electronic device stores (operation 706) the integrity data 304 including the plurality of integrity data items in the second memory block 306B, and each memory die of the second memory block 306B is distinct from the one or more respective dies of the first memory block 306A. Each memory die of the first memory block 306A is distinct from the one or more respective dies of the second memory block 306B. The first memory block 306A and the second memory blocks 306B have entirely different memory dies. The electronic device invalidates (operation 708) the integrity data 304 in the second memory block 306B, and reads (operation 710) the user data 302 from the first memory block 306A independently of the integrity data 304.

In some embodiments, before invalidating the integrity data 304 in the second memory block 306B, the electronic device reads back (operation 712) the user data 302 from the first memory block 306A, and determines (operation 714)

that the user data 302 is valid based on the integrity data 304. The integrity data 304 in the second memory block 306B is invalidated in accordance with a determination that the user data 302 is valid based on the integrity data 304. The integrity data 304 in the second memory block 306B is discarded (operation 716). Stated another way, the user data 302 is stored in the first memory block 306A without the integrity data 304, and is read from this on without checking data validity based on the integrity data 304.

In some embodiments, prior to storing the user data 302 in the first memory block 306A, the electronic device stores (operation 718) the user data 302 in a third memory block 306C that is distinct from the first and second memory blocks. The electronic device reads (operation 720) back the user data 302 from the third memory block 306C and determines (operation 722) that the user data 302 read from the third memory block 306C is invalid based on the integrity data 304 stored in the second memory block 306B. Further, in some embodiments, in accordance with a determination that a subset of the user data 302 stored in the third memory block 306C is invalid, the electronic device duplicates (operation 724) the user data 302 from the third memory block 306C to the first memory block 306A, corrects (operation 726) the user data 302 in the first memory block 306A based on the integrity data 304, and purges (operation 728) the user data 302 in the third memory block 306C.

In some embodiments, the memory system 200 includes an SSD 112 of the electronic device, and each memory die 206 includes a plurality of memory planes 208. Each memory plane 208 includes a plurality of memory pages 210, and each memory page 210 includes a plurality of memory cells. Further, in some embodiments, the user data 302 includes a plurality of user data sets 402, and each user data set 402 is configured to occupy one or more respective first memory pages. The user data 302 are stored in the first memory block 306A by successively and after obtaining each of the plurality of user data sets 402 in a buffer, storing the respective user data set as a whole (e.g., jointly, in response to a memory command) into the one or more respective memory pages 210 of the first memory block 306A. Additionally, in some embodiments, the integrity data 304 includes a plurality of integrity data sets 404, and each integrity data set 404 is configured to occupy one or more respective second memory pages. Specifically, after obtaining each of the plurality of integrity data sets 404 in a buffer, the respective integrity data set 404 is stored as a whole (e.g., jointly, in response to a memory command) into the one or more respective second memory pages 210 of the second memory block 306B. The plurality of integrity data sets 404 are stored successively in the second memory block 306B. The buffer is optionally an SRAM buffer 224 or an HMB 228. The one or more respective first or second memory pages 210 include a number of memory pages 210 that are read or written jointly, and the number is reconfigurable.

Further, in some embodiments, the memory system 200 includes a plurality of memory blocks 306, and the second memory block 306B is a last memory block of the plurality of memory blocks 306.

In some embodiments, the first memory block 306A includes a plurality of first cells of a first cell type (e.g., SLC). The memory system 200 further includes a fourth memory block 306D, and the fourth memory block 306D includes a plurality of second cells of a second cell type (e.g., QLC). The first cell type is distinct and different from the second cell type. The electronic device reads the user data 302 from the first memory block 306A by copying (operation 730) the user data 302 from the first memory block 306A to the fourth memory block 306D without the integrity data 304.

In some embodiments, for each of the plurality of user data items of the user data 302, the respective one of the plurality of integrity data items of the integrated data 304 is determined using an XOR logic. In some embodiments, for each of the plurality of user data items of the user data 302, the respective one of the plurality of integrity data items of the integrated data is determined 304 using a lookup table.

In some embodiments, the electronic device divides the user data 302 into a plurality of data chunks. Each data chunk has a data chunk size. The electronic device determines each of a subset of the integrity data 304 based on a subset of respective data chunks. The subset of respective data chunks includes a predefined number of data chunks. In an example, an XOR parity is obtained at different levels (e.g., on a planar level) based on a size of the subset of respective data chunks.

In some embodiments, the electronic device encodes each of the plurality of user data items of the user data 302 by a low-density parity-check (LDPC) engine to generate a respective LDPC code. The respective one of the plurality of integrity data items of the integrity data 304 that corresponds to the respective user data 302 includes the LDPC code. In some embodiments, the electronic device encodes each of the plurality of user data items of the user data 302 by a XOR parity scheme. In some embodiments, the electronic device encodes each of the plurality of user data items of the user data 302 by both the LDPC engine and a XOR parity scheme. In some embodiments, the electronic device encodes a data chunk including a set of user data items of the user data 302 by one or both of the LDPC engine and an XOR parity scheme.

In some embodiments, the memory system includes a redundant array of inexpensive disks (RAID) further including a first drive and a second drive. The first memory block includes at least part of the first drive in the RAID. The electronic device determines the integrity data 304 including a set of RAID parity data items based on a subset of the user data 302 stored in the first drive and a set of user data stored in the second drive of the RAID.

It should be understood that the particular order in which the operations in FIGS. 5-7 have been described are merely exemplary and are not intended to indicate that the described order is the only order in which the operations could be performed. One of ordinary skill in the art would recognize various ways to store user data 302 in a memory system 200 (e.g., an SSD 112). Additionally, it should be noted that details of other processes described above with respect to FIGS. 1-4 are also applicable in an analogous manner to methods 500, 600, and 700 described above with respect to FIGS. 5, 6, and 7. For brevity, these details are not repeated here.

Memory is also used to storing instructions and data associated with the methods 500, 600, and 700, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing methods 500, 600, and 700.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Particularly, any examples involving specific numbers or configurations are not intended to be exhaustive or to limit the scope of the claims to the precise examples disclosed. Many modifications and variations are possible in view of the above teachings or common knowledge of one skilled in the art. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A data storage method, comprising:

at an electronic device having a memory system that includes a first memory block and a second memory block:

storing user data in the first memory block;

storing integrity data associated with the user data in the second memory block distinct from the first memory block, wherein the user data are configured to be validated based on the integrity data;

after the first memory block is closed to further data writing:

validating the user data stored in the first memory block based on the integrity data stored in the second memory block; and in accordance with a validation of the user data, discarding the integrity data in the second memory block; and reading the user data from the first memory block independently of the integrity data.

2. The method of claim 1, further comprising:

determining whether the first memory block is open;

wherein the user data and the integrity data are stored in accordance with a determination that the first memory block is open, and the integrity data are invalidated in accordance with a determination that the first memory block is closed.

3. The method of claim 1, further comprising, before invalidating the integrity data in the second memory block:

reading back the user data from the first memory block;

determining that the user data is valid based on the integrity data, wherein the integrity data in the second memory block is invalidated in accordance with a determination that the user data is valid based on the integrity data; and discarding the integrity data in the second memory block.

4. The method of claim 1, further comprising, prior to storing the user data in the first memory block:

storing the user data in a third memory block that is distinct from the first and second memory blocks;

reading back the user data from the third memory block;

determining that the user data read from the third memory block is invalid based on the integrity data stored in the second memory block.

5. The method of claim 1, wherein the memory system includes a solid state drive of the electronic device, each memory die including a plurality of memory planes, each memory planes including a plurality of memory pages, each memory page including a plurality of memory cells.

6. The method of claim 5, wherein the user data include a plurality of user data sets, and each user data set is configured to occupy one or more respective first memory pages, storing the user data in the first memory block further comprising:

successively, after obtaining each of the user data sets in a buffer, storing the respective user data set as a whole into the one or more respective first memory pages in the first memory block.

7. The method of claim 5, wherein the integrity data include a plurality of integrity data sets, and each integrity data set is configured to occupy one or more respective second memory pages, storing the integrity data in the second memory block further comprising:

successively, after obtaining each of the plurality of integrity data sets in a buffer, storing the respective integrity data set as a whole into the one or more respective second memory pages of the second memory block.

8. The method of claim 5, wherein the memory system includes a plurality of memory blocks, and the second memory block is a last memory block of the plurality of memory blocks.

9. The method of claim 1, wherein:

the first memory block includes a plurality of first cells of a first cell type;

the memory system further includes a fourth memory block, and the fourth memory block includes a plurality of second cells of a second cell type;

the second cell type is distinct from the first cell type; and reading the user data from the first memory block, independently of the integrity data, by copying the user data from the first memory block to the fourth memory block without the integrity data.

10. The method of claim 1, wherein the user data includes a plurality of user data items, and each user data item is configured to be validated based on a respective integrity data item of the integrity data, the method further comprising:

for each of the plurality of user data items, determining the respective integrity data item using one of an XOR logic and a lookup table.

11. The method of claim 1, further comprising:

dividing the user data into a plurality of data chunks, each data chunk having a data chunk size; and determining a subset of integrity data based on a subset of data chunks, the subset of respective data chunks including a predefined number of data chunks.

12. The method of claim 11, further comprising:

encoding the user data by a low-density parity-check (LDPC) engine to generate one or more LDPC codes, the integrity data including the one or more LDPC codes.

13. An electronic device, comprising:

one or more processors;

a memory system having a first memory block and a second memory block; and memory storing one or more programs for execution by the one or more processors, the one or more programs including instructions for:

storing user data in the first memory block;

storing integrity data associated with the user data in the second memory block distinct from the first memory block, wherein the user data are configured to be validated based on the integrity data;

after the first memory block is closed to further data writing:

validating the user data stored in the first memory block based on the integrity data stored in the second memory block; and in accordance with a validation of the user data, discarding the integrity data in the second memory block; and reading the user data from the first memory block independently of the integrity data.

14. The electronic device of claim 13, the one or more programs further comprising instructions for, before invalidating the integrity data in the second memory block:

> reading back the user data from the first memory block;
>
> determining that the user data is valid based on the integrity data, wherein the integrity data in the second memory block is invalidated in accordance with a determination that the user data is valid based on the integrity data; and
>
> discarding the integrity data in the second memory block.

15. The electronic device of claim 13, the one or more programs further comprising instructions for, prior to storing the user data in the first memory block:

> storing the user data in a third memory block that is distinct from the first and second memory blocks;
>
> reading back the user data from the third memory block;
>
> determining that the user data read from the third memory block is invalid based on the integrity data stored in the second memory block.

16. The electronic device of claim 15, storing the user data in the first memory block further comprising, in accordance with a determination that a subset of the user data stored in the third memory block is invalid:

> duplicating the user data from the third memory block to the first memory block;
>
> correcting the user data in the first memory block based on the integrity data; and
>
> purging the user data in the third memory block.

17. A non-transitory computer-readable storage medium storing one or more programs for execution by one or more processors, the one or more programs comprising instructions for:

> at an electronic device having a memory system, the memory system having a first memory block and a second memory block:
>
> > storing user data in the first memory block;
> >
> > storing integrity data associated with the user data in the second memory block distinct from the first memory block, wherein the user data are configured to be validated based on the integrity data;

> > after the first memory block is closed to further data writing:
> >
> > > validating the user data stored in the first memory block based on the integrity data stored in the second memory block; and
> > >
> > > in accordance with a validation of the user data, discarding the integrity data in the second memory block; and
> >
> > reading the user data from the first memory block independently of the integrity data.

18. The non-transitory computer-readable storage medium of claim 17, the one or more programs further comprising instructions for, before invalidating the integrity data in the second memory block:

> reading back the user data from the first memory block;
>
> determining that the user data is valid based on the integrity data, wherein the integrity data in the second memory block is invalidated in accordance with a determination that the user data is valid based on the integrity data; and
>
> discarding the integrity data in the second memory block.

19. The non-transitory computer-readable storage medium of claim 17, the one or more programs further comprising instructions for:

> determining whether the first memory block is open;
>
> wherein the user data are read from the first memory block independently of the integrity data after the first memory block is closed.

20. The non-transitory computer-readable storage medium of claim 17, wherein the memory system includes a redundant array of inexpensive disks (RAID) including a first drive and a second drive, and the first memory block includes at least part of the first drive in the RAID, the one or more programs further comprising instructions for:

> determining the integrity data including a set of RAID parity data items based on a subset of the user data stored in the first drive and a set of user data stored in the second drive of the RAID.

* * * * *